US008352756B2

(12) United States Patent
Konno

(10) Patent No.: US 8,352,756 B2
(45) Date of Patent: Jan. 8, 2013

(54) IMAGE PROCESSING APPARATUS

(75) Inventor: Kazuhito Konno, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 593 days.

(21) Appl. No.: 12/569,989

(22) Filed: Sep. 30, 2009

(65) Prior Publication Data

US 2010/0218016 A1 Aug. 26, 2010

(30) Foreign Application Priority Data

Feb. 25, 2009 (JP) ................................. 2009-041930

(51) Int. Cl.
*G06F 1/26* (2006.01)

(52) U.S. Cl. ......................... 713/300; 713/310; 713/320

(58) Field of Classification Search .................. 713/300, 713/310, 320

See application file for complete search history.

(56) References Cited

U.S. PATENT DOCUMENTS

| | | | | |
|---|---|---|---|---|
| 5,884,122 | A | 3/1999 | Kawabuchi et al. | |
| 2008/0086659 | A1 * | 4/2008 | Ishikawa et al. | 714/22 |
| 2010/0162082 | A1 * | 6/2010 | Umezawa | 714/763 |

FOREIGN PATENT DOCUMENTS

| | | | |
|---|---|---|---|
| JP | 09-091171 | A | 4/1997 |
| JP | 10-27042 | A | 1/1998 |
| JP | 2004-212601 | A | 7/2004 |
| JP | 2008-129096 | A | 6/2008 |
| JP | 2008-306392 | A | 12/2008 |

OTHER PUBLICATIONS

Notification of Reason for Refusal dated Nov. 2, 2010, issued in corresponding Japanese Application No. 2009-041930.

* cited by examiner

*Primary Examiner* — Paul Yanchus, III
*Assistant Examiner* — Zahid Choudhury
(74) *Attorney, Agent, or Firm* — Sughrue Mion, PLLC

(57) ABSTRACT

An image processing apparatus includes a volatile storing unit, a nonvolatile storing unit, a processing control unit, a transfer unit and a power controlling unit. The processing control unit controls image processing and writes a result of the control as history information into the volatile storing unit. The transferring unit transfers the history information from the volatile storing unit to the nonvolatile storing unit. The power controlling unit transfers the history information to the transferring unit transfer when detecting an abnormality of the processing control unit based on a communication with the processing control unit, and stops a supply of a power after a passage of a certain time since the detection of the abnormality.

8 Claims, 3 Drawing Sheets

IMAGE PROCESSING APPARATUS

CROSS-REFERENCE TO RELATED APPLICATIONS

This application is based on and claims priority under 35 USC 119 from Japanese Patent Application No. 2009-041930 filed on Feb. 25, 2009.

BACKGROUND

1. Technical Field

The present invention relates to an image processing apparatus.

2. Related Art

There has been proposed a copying machine having crash detecting unit detects a crash of a CPU.

The copying machine includes a CPU for controlling apparatus, a watchdog timer serving as crash detecting unit, and a reset generating circuit for executing a reset processing of the CPU when a crash is detected by the watchdog timer.

SUMMARY

[1] According to an aspect of the invention, an image processing apparatus includes a volatile storing unit, a nonvolatile storing unit, a processing control unit, a transfer unit and a power controlling unit. The processing control unit controls image processing and writes a result of the control as history information into the volatile storing unit. The transferring unit transfers the history information from the volatile storing unit to the nonvolatile storing unit. The power controlling unit transfers the history information to the transferring unit transfer when detecting an abnormality of the processing control unit based on a communication with the processing control unit, and stops a supply of a power after a passage of a certain time since the detection of the abnormality.

BRIEF DESCRIPTION OF THE DRAWINGS

Exemplary embodiments of the invention will be described in detail based on the following figures, wherein.

DETAILED DESCRIPTION

An image processing apparatus according to an exemplary embodiment of the invention includes a volatile storing unit, a nonvolatile storing unit, a processing control unit for controlling an image processing and writing a result of the control as history information to the volatile storing unit, a transferring unit for transferring the history information from the volatile storing unit to the nonvolatile storing unit, and a power controlling unit for transferring the history information by the transferring unit to disconnect a power supply after a passage of a certain time since a detection of an abnormality when detecting the abnormality of the processing control unit based on a communication with the processing control unit.

In the structure, when the abnormality of the processing control unit is detected, the history information is transferred by the transferring unit and a supply of the power is then stopped. Also in the case in which the supply of the power is stopped, therefore, it is possible to leave the history information in the nonvolatile storing unit.

Figure 1:
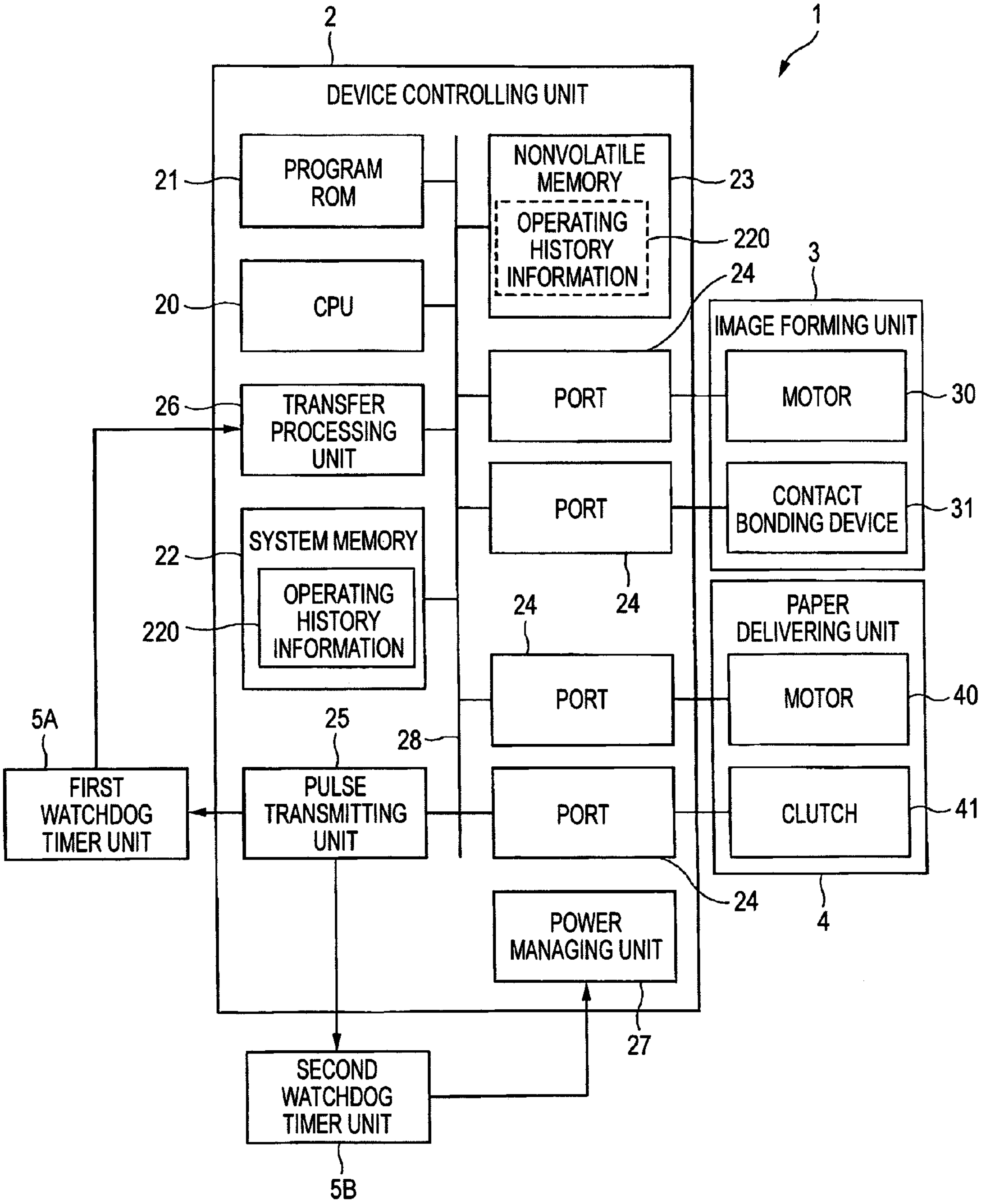
FIG. 1 is a block diagram showing an example of a schematic structure of an image processing apparatus according to an embodiment of the invention.
Figure 2:
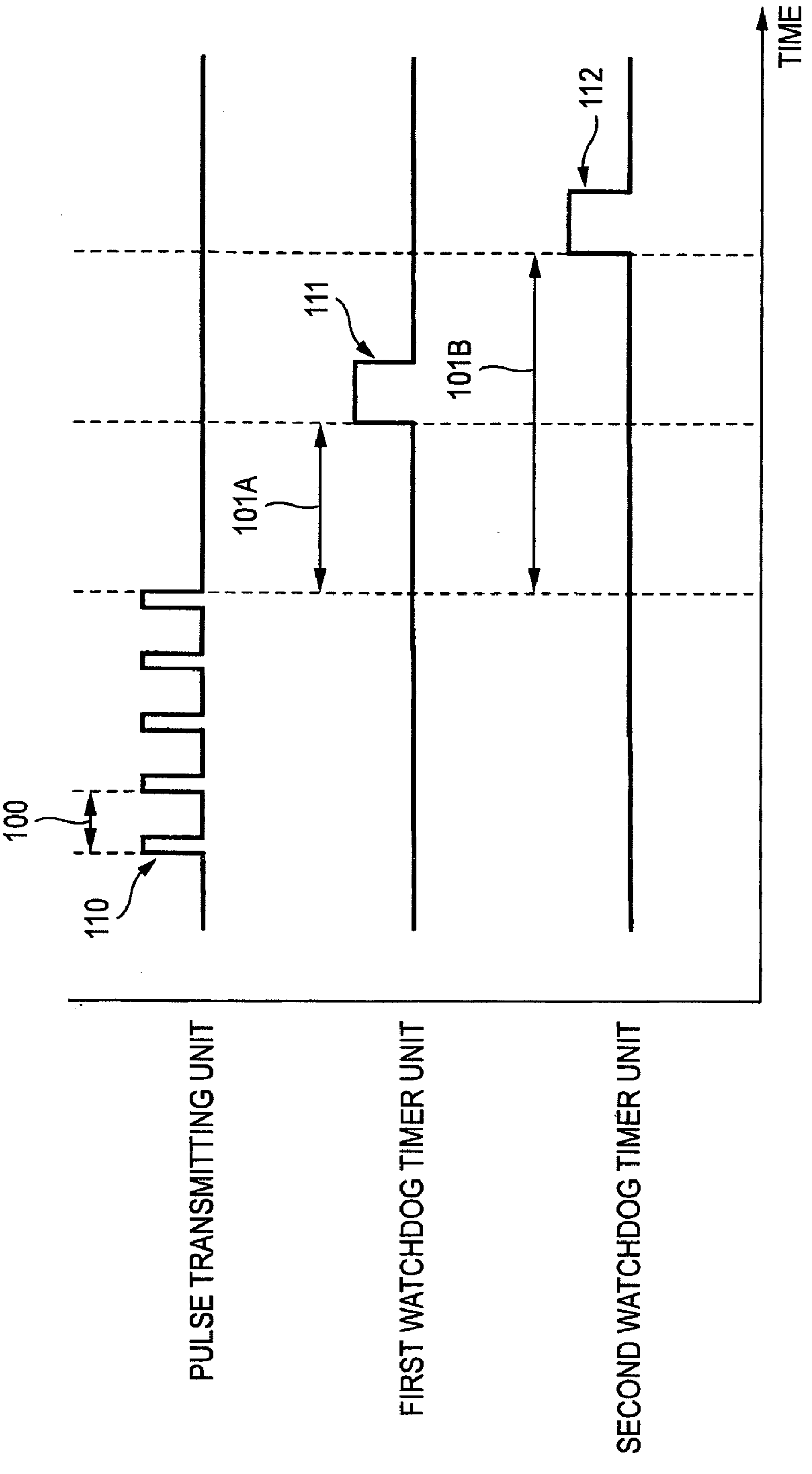
FIG. 2 is a signal waveform diagram showing an example of an internal signal in the image processing apparatus.

FIG. 1 is a block diagram showing an example of a schematic structure of the image processing apparatus according to the exemplary embodiment of the invention. FIG. 2 is a signal waveform diagram showing an example of an internal signal in the image processing apparatus.

An image processing apparatus 1 includes a device controlling unit 2 for controlling control target devices which are possessed by an image forming unit 3 and a paper delivering unit 4, the image forming unit 3, the paper delivering unit 4, a first watchdog timer unit 5A serving as a first abnormality detecting unit, and a second watchdog timer unit 5B serving as a second abnormality detecting unit. The image forming unit 3, the paper delivering unit 4, the first watchdog timer unit 5A and the second watchdog timer unit 5B are connected to the device controlling unit 2, respectively.

The device controlling unit 2 includes a CPU 20 serving as an example of a processing control unit, a program ROM 21, a system memory 22 serving as an example of a volatile storing unit, a nonvolatile memory 23 serving as an example of a nonvolatile storing unit, a plurality of ports 24, a pulse transmitting unit 25, a transfer processing unit 26 serving as an example of a transferring unit, and a power managing unit 27, and the program ROM 21, the system memory 22, the nonvolatile memory 23, the port 24, the pulse transmitting unit 25 and the transfer processing unit 26 are mutually connected through a bus 28. The power managing unit 27 and the first and second watchdog timer units 5A and 5B may constitute a power controlling unit.

The program ROM 21 stores an image processing program which is not shown. In the case in which the program ROM 21 has a writable storage area other than a storage area which stores the image processing program, operating history information which will be described below may be transferred and written to the storage area.

The CPU 20 is operated in accordance with the image processing program of the program ROM 21 to control the control target device, the image forming unit 3 and the paper delivering unit 4 and to control an image processing such as a processing or conversion of image information to be used for forming an image by the image forming unit 3. Moreover, the CPU 20 writes, to the system memory 22, operating history information related to the image processing apparatus 1. The operating history information is used for specifying the cause of an abnormality of the device and includes information about a history of an internal processing to be executed in the device.

For example, the operating history information may include information about access to a register provided by hardware constituting the image processing apparatus 1, internal information of a software module constituting the image processing apparatus 1, information about an execution of a library of an operating system for managing a memory resource or a CPU resource, information about an interruption in the operating system, and information about a function which is being executed by the software module in an occurrence of an abnormality and an argument thereof.

More specifically, it is also possible to include information about a processing request for the image processing apparatus 1 (for example, a history related to a user interface operation, information indicating that data are received from an outside, or contents of the receipt), information about an instruction in the internal processing of the image processing apparatus 1 (for example, an instruction for controlling the control target device, the image forming unit 3 and the paper delivering unit 4 and a result of the control based on the instruction), an operating state of the image processing apparatus 1 (information indicating that an image is being formed, a standby is being carried out or an energy saving mode is being set and a history of a transition of their operating states), and information for specifying a time that each of the processings is executed or a time that the operating state makes a transition.

The system memory 22 is implemented by an RAM, for example. The system memory 22 has a characteristic that a data writing speed is higher and a rewritable resistance is more excellent through the CPU 20 than the nonvolatile memory 23, for example.

The nonvolatile memory 23 is implemented by a flash memory or an HDD, for example.

The control target devices are connected to the ports respectively, and various signals are input/output between the CPU 20 and the control target devices.

In the case in which the CPU 20 is operated normally, the pulse transmitting unit 25 carries out a communication with the first and second watchdog timer units 5A and 5B. More specifically, the pulse transmitting unit 25 transmits an operation guaranteeing pulse 110 to the first and second watchdog timer units 5A and 5B every pulse cycle time 100 as shown in FIG. 2. When the CPU 20 starts a crash due to a malfunction of the image processing program, the pulse transmitting unit 25 stops the transmission of the operation guaranteeing pulse 110.

The transfer processing unit 26 is a controller for transferring data between the system memory 22 and the nonvolatile memory 23 without using the CPU 20 by a DMA (Direct Memory Access) memory, for example. Upon receipt of an interrupt signal from the first watchdog timer unit 5A, the transfer processing unit 26 carries out a processing for transferring operating history information 220 held in the system memory 22 to the nonvolatile memory 23. The transfer processing may be carried out by the CPU 20 in place of the transfer processing unit 26.

The power managing unit 27 supplies a power to each unit in the control target devices and the device controlling unit 2 through a power line which is not shown. The power managing unit 27 stops the supply of the power to each unit in the control target devices and the device controlling unit 2 upon receipt of a reset signal from the second watchdog timer unit 5B.

The image forming unit 3 includes rotors, for example, a photosensitive drum, a developing roller and a transferring belt (not shown) which form a visible image onto a paper delivered by the paper delivering unit 4, a motor 30 for rotating the rotors, and a contact bonding device 31 for fixing an image transferred onto the paper by the photosensitive drum onto the paper by a heat and a pressurizing force. The motor 30 and the contact bonding device 31 are the control target devices connected to the ports 24.

The paper delivering unit 4 includes a tray (not shown) for accommodating papers of A4 and B4 every size, for example, a motor 40 for delivering the paper from the tray along a delivering path and a clutch 41 for controlling a transmission of a rotating force of the motor 40 and a release thereof. The motor 40 and the clutch 41 are the control target devices connected to the ports 24.

It is sufficient that the control target device is a driving unit related to the image processing apparatus and is not restricted to the motors 30 and 40, the contact bonding device 31 and the clutch 41.

The first watchdog timer unit 5A receives the operation guaranteeing pulse 110 from the pulse transmitting unit 25 every pulse cycle time 100, and does not receive the operation guaranteeing pulse 110 from the pulse transmitting unit 25 within a first specified time 101A, thereby detecting an abnormality of the CPU 20 as shown in FIG. 2. The first watchdog timer unit 5A transmits an interrupt signal 111 for giving a request for a transfer processing to the transfer processing unit 26 when detecting the abnormality of the CPU 20.

The second watchdog timer unit 5B receives the operation guaranteeing pulse 110 from the pulse transmitting unit 25 every pulse cycle time 100, and does not receive the operation guaranteeing pulse 110 from the pulse transmitting unit 25 within a second specified time 101B, thereby detecting the abnormality of the CPU 20 as shown in FIG. 2. The second watchdog timer unit 5B transmits a reset signal 112 for giving a request for stopping a supply of a power to the power managing unit 27 when detecting the abnormality of the CPU 20.

The second specified time 101B of the second watchdog timer unit 5B is set to be longer than the first specified time 101A of the first watchdog timer unit 5A as shown in FIG. 2. Moreover, a time difference between the first and second watchdog timer units 5A and 5B, that is, a time obtained by subtracting the first specified time 101A from the second specified time 101B is set to be longer than a time required for the transfer processing of the transfer processing unit 26.

The first and second watchdog timer units 5A and 5B may be constituted as a single timer unit. In that case, it is sufficient that the timer unit detects the abnormality of the CPU 20 and transmits the reset signal 112 to the power managing unit 27 after a certain time since the transmission of the interrupt signal 111 to the transfer processing unit 26, that is, after a passage of a time obtained by subtracting the first specified time 101A from the second specified time 101B. Moreover, the two specified times 101A and 101B may be set by a method utilizing time constants of a capacitor and a resistor or a method using two internal timers, for example.

Figure 3:
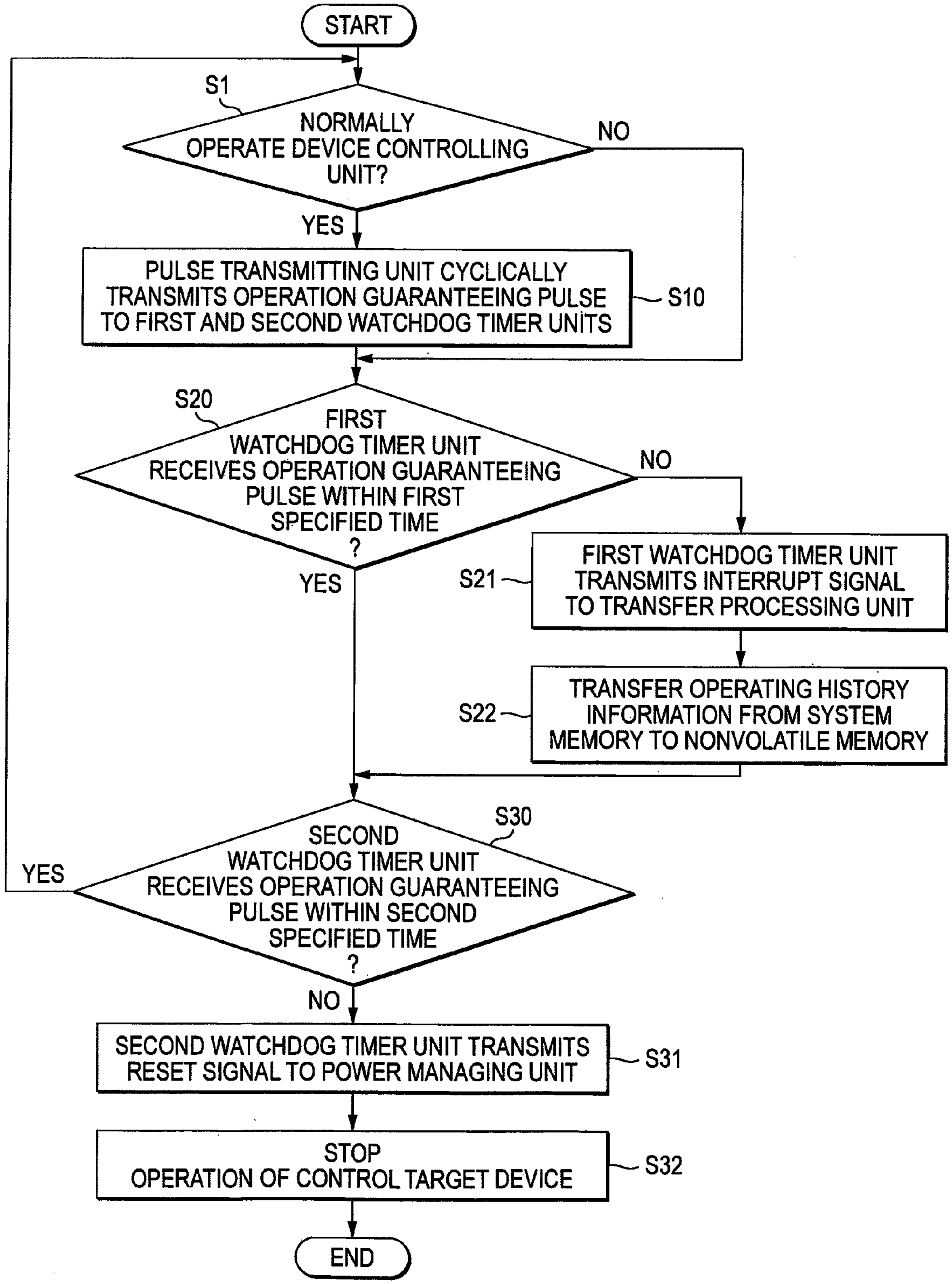
FIG. 3 is a flowchart showing an example of an operation of the image processing apparatus.

FIG. 3 is a flowchart showing an example of the operation of the image processing apparatus. First of all, if the device controlling unit 2 is operated normally in the image processing apparatus 1 (S1: Yes), the operation guaranteeing pulse 110 is transmitted from the pulse transmitting unit 25 to the first and second watchdog timer units 5A and 5B every pulse cycle time 100 (S10).

If the CPU 20 starts a crash by the cause of a malfunction of the image processing program in the device controlling unit 2 (S1: No), moreover, the operation guaranteeing pulse 110 is not transmitted from the pulse transmitting unit 25 to the first and second watchdog timer units 5A and 5B.

On the other hand, the first watchdog timer unit 5A monitors whether or not the operation guaranteeing pulse 110 is received from the pulse transmitting unit 25 within the first specified time 101A separately from the operation of the device controlling unit 2 (S20). Furthermore, the second watchdog timer unit 5B also monitors whether the operation guaranteeing pulse 110 is received from the pulse transmitting unit 25 within the second specified time 101B or not (S30).

If the first and second watchdog timer units 5A and 5B receive the operation guaranteeing pulse 110 within the first and second specified times 101A and 101B respectively (S20: Yes, S30: Yes), the processing proceeds to the Step S1 and the monitoring operation is continuously carried out.

On the other hand, if the first watchdog timer unit 5A does not receive the operation guaranteeing pulse 110 within the first specified time 101A (S20: No), the first watchdog timer unit 5A transmits the interrupt signal 111 to the transfer processing unit 26 (S21). Upon receipt of the interrupt signal 111, the transfer processing unit 26 transfers the operating history information 220 of the system memory 22 to the nonvolatile memory 23 (S22).

If the second watchdog timer unit 5B does not receive the operation guaranteeing pulse 110 within the second specified time 101B (S30: No), furthermore, the second watchdog timer unit 5B transmits the reset signal 112 to the power managing unit 27 (S31). Upon receipt of the reset signal 112, the power managing unit 27 stops the supply of the power to each unit in the control target devices and the device controlling unit 2 (S32).

As described above, when the supply of the power is stopped by the power managing unit 27, the operating history information 220 of the system memory 22 is lost. However, the operating history information 220 has been transferred to the nonvolatile memory 23 before resetting. Therefore, the operating history information 220 of the nonvolatile memory 23 can be then utilized.

For example, when the image processing apparatus 1 is thereafter turned ON, it gives a notice that the operating history information 220 is stored in the nonvolatile memory 23 and the user gives an instruction for an output, for example, a screen output of the operating history information 220, a printing output and an output of data to a recording medium so that the image processing apparatus outputs the operating history information 220 in accordance with the instruction. The user utilizes the operating history information 220 thus output for an analysis of the cause of a malfunction. Moreover, the nonvolatile memory 23 may be removed from the image processing apparatus 1 and may be attached to an information processing apparatus (PC) to read the operating history information 220 stored in the nonvolatile memory 23 from the information processing apparatus.

The invention is not restricted to the embodiment but various changes can be made without departing from the scope of the invention. For example, although the image processing apparatus has the image forming unit in the embodiment, it may further include an image reading unit or a fax communicating unit.

What is claimed is:

1. An image processing apparatus comprising:

a volatile storing unit;

a nonvolatile storing unit;

a processing control unit that controls image processing and writes a result of the control as history information into the volatile storing unit;

a transferring unit that transfers the history information from the volatile storing unit to the nonvolatile storing unit; and a power controlling unit that causes the transferring unit to transfer the history information from the volatile storing unit to the nonvolatile storing unit when detecting an abnormality of the processing control unit based on a communication with the processing control unit, and stops a supply of a power after a passage of a certain time since the power controlling unit detects the abnormality, wherein the history information includes information about access to a register included in the image processing apparatus, a software module included in the image processing apparatus, an execution of a library of an operating system in the image processing apparatus, an interruption in the operating system, a function which is being executed by the software module in an occurrence of the abnormality, a processing request of the image processing apparatus, an instruction of the image processing apparatus, an operating state of the image processing apparatus, and at least one of a time that each processing is executed and a time that an operating state of the image processing apparatus makes a transition.

2. The image processing apparatus according to claim 1, wherein the power controlling unit includes a first abnormality detecting unit and a second abnormality detecting unit, the first abnormality detecting unit detects the abnormality of the processing control unit through a passage of a first specified time after a stoppage of a processing of the processing control unit, and causes the transferring unit to transfer the history information when the abnormality of the processing control unit is detected by the first abnormality detecting unit, the second abnormality detecting unit detects the abnormality of the processing control unit through a passage of a second specified time after the stoppage of the processing of the processing control unit, and stops the supply of the power when the abnormality of the processing control unit is detected by the second abnormality detecting unit, and the passage of the second specified time is longer than that of the first specified time.

3. The image processing apparatus according to claim 1, further comprising a driving unit, wherein the processing control unit controls the driving unit related to the image processing, and the power controlling unit stops the supply of the power to the driving unit.

4. The image processing apparatus according to claim 1, wherein the nonvolatile storing unit stores a control program of the image processing apparatus.

5. An image processing apparatus comprising:

a volatile storing unit;

a nonvolatile storing unit;

a processing control unit that controls image processing and writes a result of the control as history information into the volatile storing unit;

a transferring unit that transfers the history information from the volatile storing unit to the nonvolatile storing unit; and a power controlling unit that causes the transferring unit to transfer the history information from the volatile storing unit to the nonvolatile storing unit when detecting an abnormality of the processing control unit based on a communication with the processing control unit, and stops a supply of a power after a passage of a certain time since the power controlling unit detects the abnormality, wherein the history information includes information about access to a register included in the image processing apparatus, a software module included in the image processing apparatus, an execution of a library of an operating system in the image processing apparatus, an interruption in the operating system, a function which is being executed by the software module in an occurrence of the abnormality, a processing request of the image processing apparatus, an instruction of the image processing apparatus, an operating state of the image processing apparatus, and at least one of a time that each processing is executed and a time that an operating state of the image processing apparatus makes a transition, and wherein, when the image processing apparatus is turned on, the image processing apparatus gives a notice that the history information is stored in the nonvolatile storing unit and accepts an instruction for outputting the history information in accordance with the instruction.

6. The image processing apparatus according to claim 1, wherein the nonvolatile storing unit is detachable from the image processing apparatus.

7. The image processing apparatus according to claim 1, wherein the history information stored in the nonvolatile storing unit is displayed on a screen.

8. The image processing apparatus according to claim 5, wherein the history information stored in the nonvolatile storing unit is printed based on the instruction.

* * * * *